United States Patent [19]
Ricci et al.

[11] Patent Number: 5,504,426
[45] Date of Patent: Apr. 2, 1996

[54] CHECK VALVE POSITION INDICATION SYSTEM AND METHOD

[75] Inventors: Roy J. Ricci, Annapolis, Md.; Gary L. Hill, Kennesaw, Ga.; Charles A. Burton, White, Ga.; Rodney M. Eslinger, Marietta, Ga.

[73] Assignee: Westinghouse Electric Corporation, Pittsburgh, Pa.

[21] Appl. No.: 987,471

[22] Filed: Dec. 7, 1992

[51] Int. Cl.$^6$ .............................. G01B 7/14; F16K 37/00
[52] U.S. Cl. ................. 324/207.17; 324/207.24; 137/554
[58] Field of Search ................. 324/207.13, 207.16, 324/207.17, 207.22, 207.24, 207.26, 226; 137/554

[56] References Cited

U.S. PATENT DOCUMENTS

| | | | |
|---|---|---|---|
| 3,707,672 | 12/1972 | Miller et al. | 324/41 |
| 4,782,702 | 11/1988 | Boone et al. | 73/597 |
| 4,929,896 | 5/1990 | Lara | 324/240 |
| 4,929,898 | 5/1990 | Spies | 324/242 |
| 4,977,778 | 12/1990 | Nafziger et al. | 73/597 |
| 5,059,902 | 10/1991 | Linder | 324/207 |
| 5,086,273 | 2/1992 | Leon | 324/207.17 |
| 5,198,764 | 3/1993 | Spencer | 324/207.26 |

OTHER PUBLICATIONS

Wittig, G., et al. "Design of a Pulsed Eddy–Current Test Equipment with Digital Signal Analysis" American Society for Testing and Materials, pp. 387–397 1981.
Haynes, H. D., "Check Valves: Oak Ridge's New Diagnostics" Medical Engineering May 1991, pp. 64–69.
Gibbs, et al. "Pulsed Eddy Current Inspection of Cracks Under Installed Fasteners" Materials Evaluation–Jan. 1991 pp. 51–60 Staveley Instruments Inc. Brochure Nortec 30 Eddyscan.

*Primary Examiner*—Walter E. Snow
*Attorney, Agent, or Firm*—D. G. Maire

[57] ABSTRACT

Electromagnetic field pulses are induced in an electrically conductive/magnetically permeable housing and valving element movable within the housing of a check valve by an energizing coil placed against the housing and forming a loop extending substantially over the full range of travel of the valving element. At least two sensing coils positioned within the loop of the energizing coil proximate the two ends of the range of travel of the valving element, and preferably an array including additional sensing coils spaced between the two end coils, detect transient responses to the induced pulses from which the position of the valving element is determined.

25 Claims, 2 Drawing Sheets

CHECK VALVE POSITION INDICATION SYSTEM AND METHOD

BACKGROUND OF THE INVENTION

1. Field of the Invention

This invention relates to sensing through a check valve housing, hereinafter referred to as the valve body, the position of the internal moveable valving element, hereinafter referred to as the disk, using a transient electromagnetic field to detect the position of an electrically conductive and/or magnetically permeable disk within the valve body which may also be electrically conductive and/or magnetically permeable.

2. Background Information

Check valves are commonly used in fluid systems to limit-flow to one direction. Typically, such check valves have a disk, enclosed within the valve body, which is movable from open to closed positions. In certain applications, for instance nuclear power plants, it is desirable to be able to verify the operation of a check valve. Ideally, this should be accomplished without physical penetration of the valve body or physical dismantling of the valve assembly, i.e., non-invasively.

Electromagnetic check valve inspection systems have been developed for non-invasive monitoring of the position of the internal movable disk in a check valve by applying either low-frequency steady-state alternating current (AC) or fixed direct current (DC) magnetic fields to the external surface of the valve body such that the magnetic field penetrates the valve body and the disk in such a manner that the magnetic field on the external surface of the valve body is influenced by the position of the internal disk. Magnetic sensors are placed at one or more positions in the vicinity of or on the external surface of the valve body to detect changes in the magnetic field at those positions associated with movement of the disk.

The AC methods developed use the basic principles of eddy-current instrumentation in which the applied AC fields result in generation of eddy-currents in the valve structure which in turn result in secondary fields which are those sensed on or near the surface. The characteristics of those secondary fields i.e., magnitude and phase with respect to the primary applied field are sensed with appropriate magnetic field sensors such as coils or Hall-effect devices. At any sensing point, the characteristics of the secondary fields are altered by movement of the disk and those measured changes are calibrated in terms of the position of the disk. See for example; (1) Haynes, H. D., "Check Valves: Oak Ridge's New Diagnostics," Mechanical Engineering, May 1991, (2) Leon, R. L., U.S. Pat. Nos. 5,086,273 and 5,140, 263. For valves with wall thickness ½" or greater, the frequency of the applied AC field must be very low, typically 60 Hz or lower and/or the strength of the applied field very high, typically 2500 Amp-turns or greater in order to adequately penetrate the valve body of both ferrous and nonferrous valves and induce fields in the moving disk. As the changes in the amplitude and/or phase of the secondary field components associated with movement of the disk are extremely small in comparison with those of the associated with the valve body which is in much closer proximity to the primary field excitation coil and sensors, the measuring system essentially requires taking the difference between two very large signals to extract the desired small signal. This is an error-sensitive measurement technique, a disadvantage of AC methods for this application.

Another drawback with single-frequency eddy-current techniques for valve inspection is that there is limited signal information at only one frequency making it difficult to discriminate the secondary field component associated with the disk from that associated with the large and thick valve body. This situation is analogous to the problem in eddy-current inspection of tubing structures where it is required to detect flaws on the outside of a tube wall using eddy-current probes (coils) inside the tube, the problem further compounded by the presence of tube support structures on the outside. In that and other eddy-current applications, performance is greatly enhanced by using multi-frequency techniques in which two or more frequencies are simultaneously applied to the excitation coil and the sensed signals at each frequency processed to yield information essentially associated with different depths of the structure to enhance discrimination of the defect signal at the desired depth in the overall structure.

The DC methods developed for check valve inspection for disk position sensing are based on variations of classical Magnetic Flux Leakage (MFL) methods used in the non-destructive testing of ferrous materials (see H. D. Haynes reference cited earlier). In this method a DC field is applied to the valve body using either large permanent magnets or DC coils placed externally on or near the valve body and of sufficient magnetic field strength to penetrate the valve body and the disk. DC magnetic field sensors such as Hall-effect devices are placed on or near the valve body at locations suitable to detect the change of the magnetic field associated with movement of the disk. This is similar to the MFL methods for the inspection of large steel billets for the detection of subsurface voids, cracks or other anomalies. Currently, Hall-effect sensors are the only practical sensing means for this valve inspection application taking into consideration cost, complexity, etc. Hall-effect devices are generally low sensitivity devices which poor temperature coefficients of sensitivity and linearity. This is a serious drawback for practical valve inspection. Another disadvantage in the DC methods is that small changes in the relative placement of the magnets (or DC coils), and sensor or sensors, and/or changes in pipe system geometry in the vicinity of the valve will probably dramatically change the functional relationship between the applied primary field and the sensed secondary field associated with the disk position. Furthermore, DC methods can only be applied to ferrous (magnetically permeable) valves, and cannot be used on non-ferrous (stainless steel, brass, etc.) valves.

In recent years, pulsed-eddy current (PEC) techniques have been developed for a wide range of applications requiting eddy-current analysis. Applications include geophysical exploration, metal detection systems and non-destructive testing. See for example; (1) Gibbs, M. et al., "Pulsed Eddy Current Inspection of Cracks Under Installed Fasteners," Materials Evaluation, January 1991, (2) P. F. Lara, U.S. Pat. No. 4,929,896, (3) B. R. Spies, U.S. Pat. No. 4,929,898, (3) S. Linder, U.S. Pat. No. 5,059,902, (4) G. Witrig and H. Thomas, "Design of a Pulsed Eddy-Current Test Equipment with Digital Signal Analysis" American Society for Testing and Materials, ASTM STP 722, 1981, PP. 387–397, (5) R. C. Miller, et al., U.S. Pat. No. 3,707,672.

In PEC methods a pulsed electromagnetic field is applied to the object under test or over the space to be analyzed for a specified period of time to penetrate the object under test or to be detected and then abruptly shut off. At shut-off, the field within the metallic object tries to collapse to zero. As it collapses, however, the time-varying nature of this collapsing field induces eddy-currents in the object which generate secondary fields which try to oppose a change in the original field. The eddy currents and associated secondary fields ultimately decay to zero due to the resistive losses in the material. Appropriate magnetic field sensors (coils, Hall-effect devices, etc.) are used to sense the secondary field. The signal outputs of the sensors are electronically sampled after shut-off of the pulsed excitation field. In conventional PEC methods for various applications, the transient secondary fields generated by the pulsed excitation are sampled, in most cases, at points in time following the field shut-off. The shape, duration and amplitude of the applied pulsed field and the sampling time interval, or intervals, are application specific. The amplitude and temporal characteristics of the post turn-off secondary transient fields are dependent on the geometry, electrical conductivity and magnetic permeability of the metallic object under test and the amplitude and temporal characteristics of the applied pulsed field.

An inherent advantage of PEC methods over steady-state, single-frequency eddy-current methods is that the applied pulse width may be adjusted to assure depth of penetration into metallic structures. Increasing the pulse width is analogous to decreasing the frequency in AC methods. Furthermore, the post turn-off transient fields have time domain waveforms having a wide band frequency spectrum which is dependent upon the electrical properties of the material under test and the time-domain waveform of the applied pulse, both during the on-time and the off-time. Thus, the equivalent of both low and high frequency secondary fields may be generated with a simple pulsed field.

There remains a need for an improved method and apparatus for detecting the position of valving elements in check valves, and especially in check valves which are electrically conductive and/or magnetically permeable. Such a method and apparatus should provide stable reliable results, be simple to implement and operate, be relatively insensitive to changes in piping geometry in the vicinity of the valve and be economically practical for the intended applications.

SUMMARY OF THE INVENTION

This need and others are satisfied by the invention which is directed to detecting the position of an electrically conductive and/or magnetically permeable valving element (disk) movable within an electrically and/or magnetically permeable valve housing (body) by inducing from outside said body, an electromagnetic field pulse in the body and movable disk, sensing the transient decay or build-up following a predetermined time after turn-on or shut-off of the electromagnetic field pulse in the body and movable disk, analyzing the amplitude and temporal characteristics of those transient signals sensed and generating an indication of the position of the disk within the body from analysis of the sensed transient secondary fields.

The electromagnetic field pulse is induced in the valve body and disk by energizing coils placed adjacent the body and forming loops substantially spanning the range of movement of the disk. The transient electromagnetic field pulse is sensed by a plurality of sensing coils spaced adjacent the body over the range of movement of the disk. The sensing coils are spaced either within or outside the loops of the energizing coil. Although sensing coils are the preferred method for sensing the transient electromagnetic fields, it is recognized that other types of sensors, such as Hall-effect devices or flux-gate magnetometers may be used in applications where their limitations are tolerable or as new, improved electromagnetic field sensors are developed.

In the method of the invention, the desired results are achieved by control of the turn-on and turn-off characteristics of the excitation pulse, and appropriate analysis of the transient secondary fields at predetermined time intervals (following turn-on or turn-off of the excitation pulse) over predetermined sampling intervals which in turn are dependent on the selected turn-on and turn-off time characteristics of the applied excitation pulse. For non-ferrous valves an excitation pulse with in the order of a few milliseconds duration with a linear turn-off over a period of 100 microseconds or less followed by sampling in the order or 100 or more milliseconds following turn-off with sampling intervals in the range of a few hundred microseconds is sufficient for a wide range of valve sizes including those with body wall thickness of greater than two inches. For ferrous valves, much longer excitation pulses are required with longer linear turn-off intervals than for non-ferrous valves but still with sampling in the same range as for non-ferrous valves. This method provides essentially for the equivalent of variation and control of low frequency excitation and generation of high frequency secondary transient fields specific to the valve type and size under test. The delay following turn-on or turn-off before sampling of the transient can typically be in the range of from about 100 to 5000 microseconds. The apparatus of this invention provides for simple, economical control of the temporal characteristics of the excitation waveform and transient sampling functions specific for each valve size and type under test.

In one embodiment of the invention, two or more sensing elements such as coils are utilized, one positioned proximate one end of the range of movement of the disk. Preferably, these two coils are connected in series opposition to enhance detection of disk position by; (1) providing a differential output signal of opposite polarity at each end of the disk movement, (2) fully or partially cancelling the secondary transient field components associated only with the valve body, and (3) fully or partially cancelling interference effects from extraneous electromagnetic fields from other nearby sources such as electrical machinery, transformers, power lines, etc.

The invention embraces both apparatus and a method of detecting movable disk position in a check valve. The invention is suitable for detecting the positioning of the disk in valves in which the disk and the valve body are electrically conductive and/or magnetically permeable, including valves in which the body is several inches thick.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
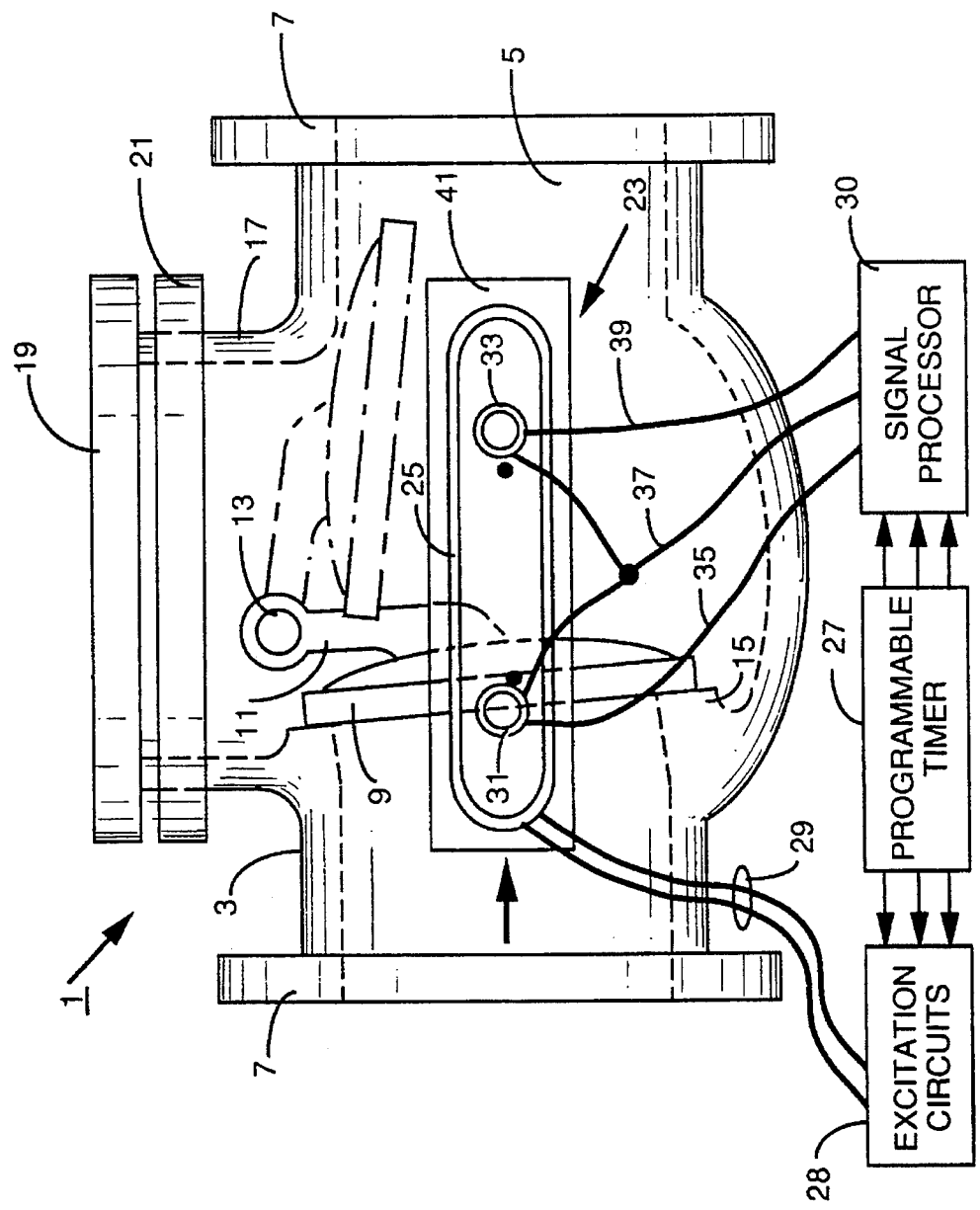
FIG. 1 is a schematic diagram of the transient electromagnetic system in accordance with the invention for detecting valve element position in a check valve.

FIG. 1 illustrates a check valve 1 which includes a housing 3 defining a flow passage 5. Flanges 7 are provided on each end of the housing 3 for securing the check valve within a pipe system (not shown).

A movable valving element 9 in the form of a disk is mounted by a support arm 11 which pivots about pin 13 for movement between a closed position shown in full line in FIG. 1 in which the disk 9 seats against valve seat 15 and an open position shown in the phantom line in FIG. 1. Such a valve allows fluid flow through the flow passage 5 in the direction of the arrow shown in FIG. 1. Flow of fluid in the opposite direction is blocked by the seating of the disk 9 against the valve seat 15. Access to the valve disk 9 is available through a maintenance port formed by a boss 17. A cover plate 19 which bolts onto a flange 21 on the boss 17 seals the maintenance opening.

The cover plate 19 must be in place when the check valve 1 is in use. As the disk 9 is completely enclosed within the housing 3, there is no direct way of determining its position. As noted above, the valve disk 9 is typically made of an electrically conductive material which may also be magnetically permeable, as in the case where a steel disk is used. In other valves, the disk 9 may be electrically conductive but not magnetically permeable as in the case of a stainless steel or brass disk. Likewise, the housing 3 may be electrically conductive and/or magnetically permeable. As used throughout, the term electrically conductive/magnetically permeable will be used to indicate that the component is either electrically conductive or magnetically permeable, or both.

In accordance with the invention, a probe assembly 23 is placed outside, but adjacent to, the valve housing 3. The probe assembly includes an energizing coil or coils 25. This energizing coil 25 defines a loop which substantially spans the range of travel of the valve disk 9. A pulsed electromagnetic field is applied to the energizing coil 25 from excitation circuits 28 which are under control of a programmable timer 27 which controls the turn-on and turn-off times (pulse width) of the excitation pulse. The rise time of the excitation field during turn-on is established by the resistance and inductance parameters of the energizing coils 25 and the voltage control in the excitation circuits 28. The programmable timer 27 provides for control of excitation pulse widths from a few microseconds to hundreds of milliseconds in order to accommodate the broad range of valve sizes and types in use in industry. The excitation circuits 28 provide for controlled shut-off of the excitation pulse with total ramp-down times in the range of tens of microseconds to hundreds of microseconds. Thus, pulses of predetermined shape, amplitude and duration are induced in the valve housing and disk.

The probe 23 further includes a pair of sensing coils 31 and 33. The sensing coil 31 is placed proximate the closed position of the valve disk 9 while the sensing coil 33 is placed proximate the open position. The coils 31 and 33 sense the electromagnetic field pulses generated in the housing and valve disk 9. The coils 31 and 33 are preferably connected in series opposition as indicated by the polarity indications on the coil and to the signal processor 30 through leads 35, 37 and 39. The signal processor 30, also under control of programmable timer 27, monitors the signals generated by the sensor coils 31 and 33 during decay of the electromagnetic field pulses generated in the valve housing and disk. The output transients sensed by the coils 31 and 33 are integrated in the signal processor 30 over a finite time interval at a specified time after field shut-off. Those times are determined such as to yield maximum sensitivity to disk position and are a function of the valve material and size (wall thickness).

As an example, when used on a three-inch, stainless steel valve, a two millisecond pulse with a peak current of 150 milliamps, was applied to the energizing coil. Sensing was begun 100 microseconds after transmitter shut-off and the decay signal was integrated over the next 400 microseconds. While it is not certain that these are optimum in terms of sensitivity and signal/noise ratio, good results are achieved.

As a second example, illustrating applications of the invention to detection of disk position in a three inch ferrous (steel) valve, a 10 millisecond pulse with a peak current of 10 amperes was used to induce the electromagnetic field pulses in the valve body and disk. Sensing was delayed for 250 microseconds after pulse turn-off and the signal was integrated for 1 millisecond.

Figure 2:
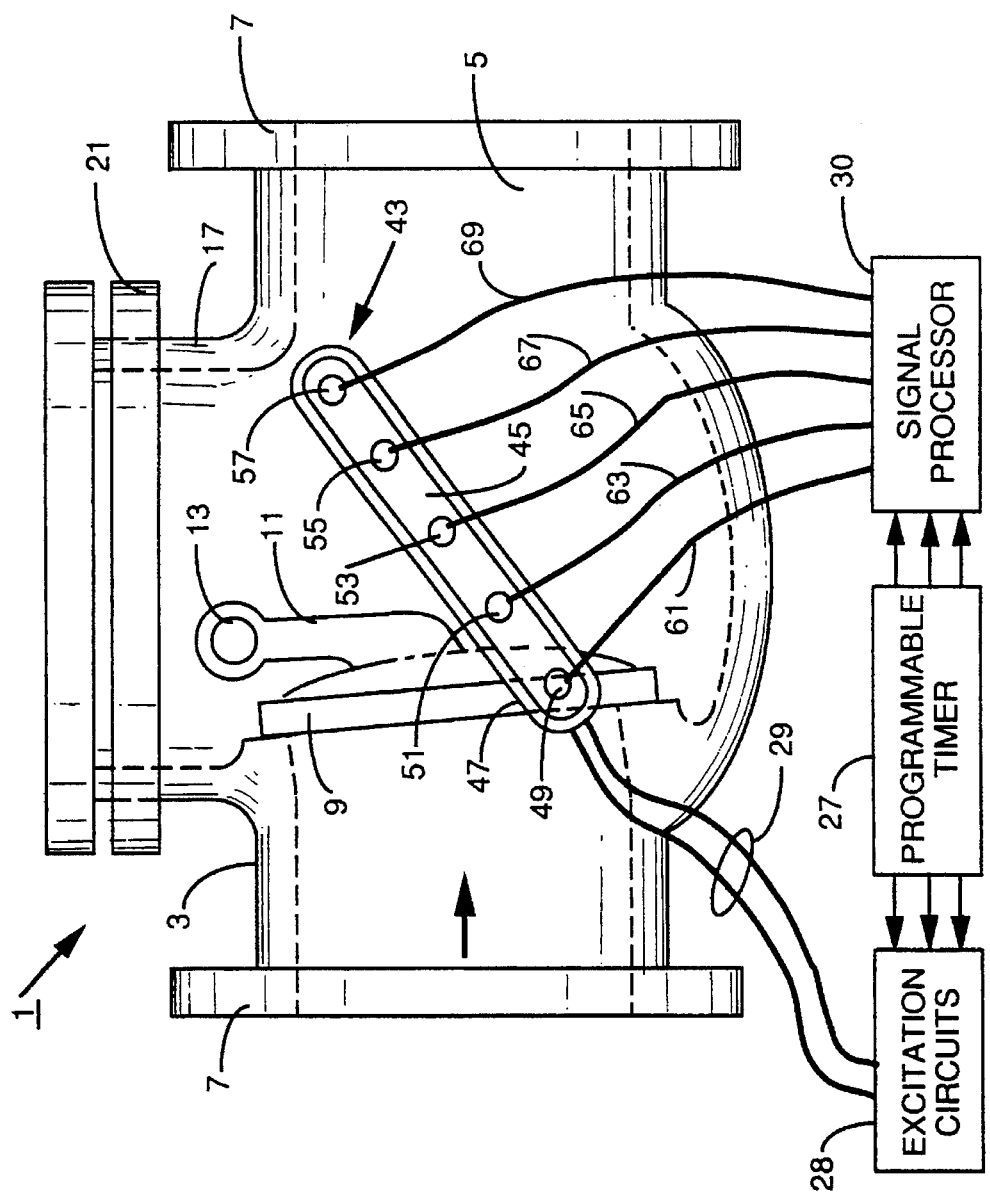
FIG. 2 is a schematic diagram of another embodiment of a transient electromagnetic system for detecting the position of the check valve valving element.

Preferably the probe 23 includes a probe body 41 which supports and fixes the energizing coil 25 and the sensing coils 31 and 33 in the relative positions shown. Preferably, the energizing coil 25 and sensing coils 31 and 33 are secured in a common plane. This probe body 41 may be a block of thermal plastic material, for instance, Grade G7 silicone laminate. If desired, the probe body, and therefore the plane of the coils can be curved to accommodate the contour of the valve housing. For more universal applications, the probe body 41 is planar. FIG. 2 illustrates another embodiment of the invention. The probe 43 includes a body 45 which supports an energizing coil 47, again forming a loop which extends substantially over the range of travel of the valve disk 9. The probe 43 further includes a series of sensing coils 49, 51, 53, 55, 57 spaced inside the energizing coil 47 with one coil, 49, proximate the closed position of the disk 9, and another sensing coil 57 proximate the full open position of the disk 9. The energizing coil 47 is connected to the excitation circuits 28 by the leads 29. Leads 61, 63, 65, 67 and 69 connect the coils 49–57, respectively, to the signal processor 30. The signal processor 30 analyzes the decay of the electromagnetic field pulses as detected by the array of sensing coils in separate signal processing channels. The outputs of the individual channels are then analyzed in the signal processor 30 to determine distribution of signal amplitudes over the array. In principle, the sensor coil immediately over the disk would yield the maximum output and be indicative of disk position. In practice, the coil array is placed in proximate position on the valve body with the outer sensor coils 47 and 57 proximate the extreme disk positions. The outputs of each channel are then measured. The channel with the peak value is assumed to be associated with the sensor coil over the disk. The outputs of each channel are then automatically scaled such that the outer two sensor responses indicate zero percent and 100% disk opening.

While specific embodiments of the invention have been described in detail, it will be appreciated by those skilled in the art that Various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A system for detecting from outside a valve housing, the position of a movable valving element within the housing, said system comprising:

energizing coil means placed adjacent said housing, wherein said energizing coil means spans a range of movement of said movable valving element;

energizing means applying a current pulse of predetermined pulse amplitude and duration to said energizing coil means to induce an electromagnetic field pulse in said housing and said movable valving element;

sensing means sensing amplitude and temporal characteristics of transient secondary electromagnetic fields generated by said electromagnetic field pulse in said housing and said movable valving element; and output means generating an indication of the position of said movable valving element within said housing from said sensed amplitude and temporal characteristics of said secondary electromagnetic fields.

2. The system of claim 1 wherein said sensing means comprises a plurality of sensing elements spaced adjacent said housing over said range of movement of said movable valving element, each sensing element sensing said amplitude and temporal characteristics of said transient secondary electromagnetic fields, and wherein said output means generates said indication of the position of said movable valving element over said range of movement from said amplitude and temporal characteristics of said transient secondary electromagnetic fields sensed by said plurality of sensing elements.

3. The system of claim 2 wherein said plurality of sensing elements are spaced within said loop formed by said energizing coil means and over said range of movement of said movable valving element.

4. The system of claim 3 wherein said plurality of sensing elements comprises a first sensing element positioned proximate one end of said range of movement of said movable valving element and a second sensing element positioned proximate an opposite end of said range of movement of said movable valving element.

5. The system of claim 4 wherein said first and second sensing elements are sensing coils connected in series opposition to one another and wherein said output means includes means connected to said series connected sensing coils and generating a signal representative of a difference in voltage across said first and second sensing coils.

6. The system of claim 4 wherein said plurality of sensing elements comprises at least a third sensing element positioned within said loop of said energizing coil and spaced between said first and second sensing elements proximate an intermediate position of said movable valving element.

7. The system of claim 1 wherein at least one of said valve housing and movable valve element is non-ferrous.

8. A method for detecting the position of a valving element movable within a valve housing, said method comprising the steps of: (1) inducing in said movable valving element a pulsed electromagnetic field of predetermined pulse shape, amplitude and duration; (2) sensing at a plurality of locations outside said valve housing transient secondary electromagnetic fields produced by said pulsed electromagnetic field; and (3) analyzing amplitude and temporal characteristics of said transient secondary electromagnetic fields as sensed at said plurality of locations to determine the position of the movable valving element.

9. The method of claim 8 including delaying said sensing and analyzing the amplitude and temporal characteristics of said transient secondary electromagnetic fields until a predetermined interval following turn-on or turn-off said electromagnetic field pulses.

10. The method of claim 9 wherein said sensing and analyzing is delayed approximately 100 to 5000 microseconds.

11. The method of claim 8, wherein said movable valving element is movable over a specified range of movement and wherein said step of inducing a pulsed electromagnetic field comprises placing an energizing coil adjacent said valve housing to form a loop extending substantially over said specified range of movement of said movable valving element and applying a pulse of current to said energizing coil, and wherein said step of sensing comprises placing sensing elements adjacent each end of travel of said movable valving element and monitoring transient signals induced in said sensing elements.

12. The method of claim 10 including delaying sensing of the amplitude and temporal characteristics of said transient secondary electromagnetic fields for a specified length of time following turn-on or turn-off of said electromagnetic field pulses.

13. The method of claim 12 wherein said specified length of time is about 100 to 5000 microseconds.

14. A system for detecting the position of a movable valving element located inside a valve housing comprising:

means for inducing a transient electromagnetic field in said valving element;

a plurality of sensors located outside said valve housing and proximate a range of movement of said movable valving element, said sensors operable to provide output in response to secondary electromagnetic fields generated in said movable valving element by said transient electromagnetic field; and output means operable to indicate the relative position of said movable valving element from said sensor output.

15. The system of claim 14, wherein said plurality of sensors comprises a first sensor located proximate one end of said range of movement, and a second sensor located proximate an opposite end of said range of movement.

16. The system of claim 15, wherein said first and said second sensors are sensing coils connected in series opposition to one another.

17. The system of claim 15, further comprising a third sensor located between said first and said second sensors.

18. The system of claim 14, wherein said means for inducing a transient electromagnetic field comprises a coil forming a loop substantially spanning said range of movement.

19. The system of claim 18, wherein said means for inducing a transient electromagnetic field comprises a means for applying a current pulse to said coil.

20. The system of claim 19, wherein said output means comprises a means for analyzing said sensor outputs a predetermined time interval following turn-on or turn-off of said current pulse.

21. A method for detecting the location of a movable valving element located inside a valve housing, comprising the steps of:

inducing a transient electromagnetic field in said movable valving element;

sensing, at a plurality of locations proximate a range of movement of said valving element, the secondary electromagnetic fields generated in said movable valving element by said transient electromagnetic field; and analyzing said secondary electromagnetic fields sensed at said plurality of locations to determine the relative location of said movable valving element.

22. The method of claim 21, wherein the step of inducing a transient electromagnetic field comprises energizing a coil forming a loop substantially spanning said range of movement.

23. A system for detecting from outside an electrically conductive/magnetically permeable valve housing, the position of an electrically conductive/magnetically permeable movable valving element within the housing, said system comprising:

means inducing a transient electromagnetic field in said electrically conductive/magnetically permeable valving element within said electrically conductive/magnetically permeable valve housing;

sensing means located outside said electrically conductive/magnetically permeable valve housing sensing amplitude and temporal characteristics of transient secondary electromagnetic fields generated by said transient electromagnetic field in said electrically conductive/magnetically permeable valving element and said electrically conductive/magnetically permeable valve housing; and output means generating an indication of the position of said movable electrically conductive/magnetically permeable valving element within said electrically conductive/magnetically permeable valve housing from said sensed amplitude and temporal characteristics of said secondary electromagnetic fields wherein said sensing means comprises a plurality of sensors positioned proximate a range of movement of said movable electrically conductive/magnetically permeable valving element.

24. A system for detecting from outside an electrically conductive/magnetically permeable valve housing, the position of an electrically conductive/magnetically permeable movable valving element within the housing, said system comprising:

means inducing a transient electromagnetic field in said electrically conductive/magnetically permeable valving element within said electrically conductive/magnetically permeable valve housing;

sensing means located outside said electrically conductive/magnetically permeable valve housing sensing amplitude and temporal characteristics of transient secondary electromagnetic fields generated by said transient electromagnetic field in said electrically conductive/magnetically permeable valving element and said electrically conductive/magnetically permeable valve housing; and output means generating an indication of the position of said movable electrically conductive/magnetically permeable valving element within said electrically conductive/magnetically permeable valve housing from said sensed amplitude and temporal characteristics of said secondary electromagnetic fields wherein said means for inducing a transient electromagnetic field comprises a coil forming a loop substantially spanning a range of movement of said electrically conductive/magnetically permeable valving element.

25. A system for detecting the position of a moveable valving element within a valve housing comprising:

a means for inducing a pulsed electromagnetic field in said valve housing and said valving element;

means for sensing at a plurality of locations a transient secondary electromagnetic field generated in said valve housing and said valving element by said pulsed electromagnetic field;

means for analyzing a characteristic of said transient secondary electromagnetic field to determine the presence or absence of said valving element at a predetermined location within its range of movement within said valve housing;

output means for indicating the presence or absence of said valving element at said predetermined location.

* * * * *